(12) United States Patent
Thomson et al.

(10) Patent No.: US 7,472,010 B2
(45) Date of Patent: Dec. 30, 2008

(54) BRAKE-ACTUATING TRANSMISSION CONTROL SYSTEM

(75) Inventors: Norval P. Thomson, Dunlap, IL (US); Kent A. Casey, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 401 days.

(21) Appl. No.: 10/949,556

(22) Filed: Sep. 27, 2004

(65) Prior Publication Data

US 2006/0069484 A1    Mar. 30, 2006

(51) Int. Cl.
*G06F 17/00* (2006.01)

(52) U.S. Cl. .............................. 701/51; 701/48; 701/50; 477/1

(58) Field of Classification Search .................. 701/50, 701/51, 48; 477/71
See application file for complete search history.

(56) References Cited

U.S. PATENT DOCUMENTS

| | | | |
|---|---|---|---|
| 5,323,667 A | | 6/1994 | Tweed et al. |
| 5,529,139 A | * | 6/1996 | Kurahashi et al. ............ 180/169 |
| 5,583,766 A | * | 12/1996 | Birchenough et al. .......... 701/51 |
| 5,830,104 A | | 11/1998 | Desautels et al. |
| 5,983,149 A | * | 11/1999 | Tate et al. ...................... 701/48 |
| 6,227,626 B1 | * | 5/2001 | Blattert ........................ 303/20 |
| 6,600,988 B1 | * | 7/2003 | Da et al. ........................ 701/93 |
| 2003/0080856 A1 | * | 5/2003 | Sparacino et al. ......... 340/425.5 |
| 2004/0019411 A1 | * | 1/2004 | Kuragaki et al. ............... 701/1 |

* cited by examiner

*Primary Examiner*—Khoi H. Tran
*Assistant Examiner*—Marie A Weiskopf
(74) *Attorney, Agent, or Firm*—Finnegan, Henderson, Farabow, Garrett & Dunner

(57) ABSTRACT

A transmission control system is provided for a work machine that has a transmission and a traction device with a brake mechanism. The transmission control system has a speed sensor configured to generate a signal indicative of a travel speed of the work machine. The transmission control system also has a controller in communication with the speed sensor and the brake mechanism. The controller is configured to determine when a transmission gear change is desired. The controller is further configured to adjust operation of the brake mechanism in response to the signal from the speed sensor when the transmission gear change is desired.

40 Claims, 2 Drawing Sheets

BRAKE-ACTUATING TRANSMISSION CONTROL SYSTEM

TECHNICAL FIELD

The present disclosure relates generally to a transmission control system and, more particularly, to a transmission control system that actuates work machine braking during shifting.

BACKGROUND

A work machine such as, for example, an off-highway truck, a loader, a motor grader, or any other work machine known in the art may include an engine connected to a multi-speed bidirectional transmission that automatically shifts gears according to predetermined shift maps or that is manually shifted between gears by a work machine operator. These gear shifts may be initiated regardless of the magnitude of a rotational speed or direction differential between the engine and the transmission or regardless of the magnitude of a travel speed of the work machine. Gear shifts according to this method are inefficient and may result in excessive wear to driveline components and undesirable vibration experienced by the work machine operator.

One method to reduce vibration and the resulting wear is to bring the engine speed within a predetermined amount of the transmission speed prior to full transmission gear engagement. One such transmission control system is described in U.S. Pat. No. 5,583,766 (the '766 patent) issued to Birchenough et al. on Dec. 10, 1996. The '766 patent teaches a control system for a vehicle that regulates engine speed to a predetermined amount above a synchronization speed (equal engine and transmission speeds) during an upshift and to a predetermined amount below the synchronization speed during a downshift. The amount above and below the synchronization speed may be determined through testing to minimize stress on the driveline components without resulting in unacceptable shift hesitation and torque interruption, and may be dependent on the performance characteristics of the engine, torque converter, and transmission.

Although the vehicle control system of the '766 patent may reduce some of the vibration and wear associated with transmission gear shifting, the vehicle control system also reduces engine speed during downshifting to a level that may be undesirable for certain applications. For example, a work machine having hydraulic implements may require a predetermined engine speed to produce hydraulic pressures or flow sufficient to effectively manipulate the implements. A drop in engine speed during a downshift while simultaneously using the hydraulic implements could result in a drop in pressure and/or flow of the fluid supplied to the implements. The hydraulic pressure drop could cause a drop in implement force, while the drop in flow could cause a loss in implement speed, both possibly resulting in an overall less efficient operation of the work machine.

The disclosed transmission control system is directed to overcoming one or more of the problems set forth above.

SUMMARY OF THE INVENTION

In one aspect, the present disclosure is directed to a transmission control system for a work machine having a transmission and a traction device with a brake mechanism. The transmission control system includes a speed sensor configured to generate a signal indicative of a travel speed of the work machine. The transmission control system also includes a controller in communication with the speed sensor and the brake mechanism. The controller is configured to determine when a transmission gear change is desired. The controller is further configured to adjust operation of the brake mechanism in response to the signal from the speed sensor when the transmission gear change is desired.

In another aspect, the present disclosure is directed to a method of operating a work machine having a power source, a transmission, and a traction device with a brake mechanism. The method includes determining when a gear change of the transmission is desired and sensing a travel speed of the work machine. The method further includes adjusting operation of the brake mechanism in response to the travel speed when the transmission gear change is desired.

DETAILED DESCRIPTION

Figure 1:
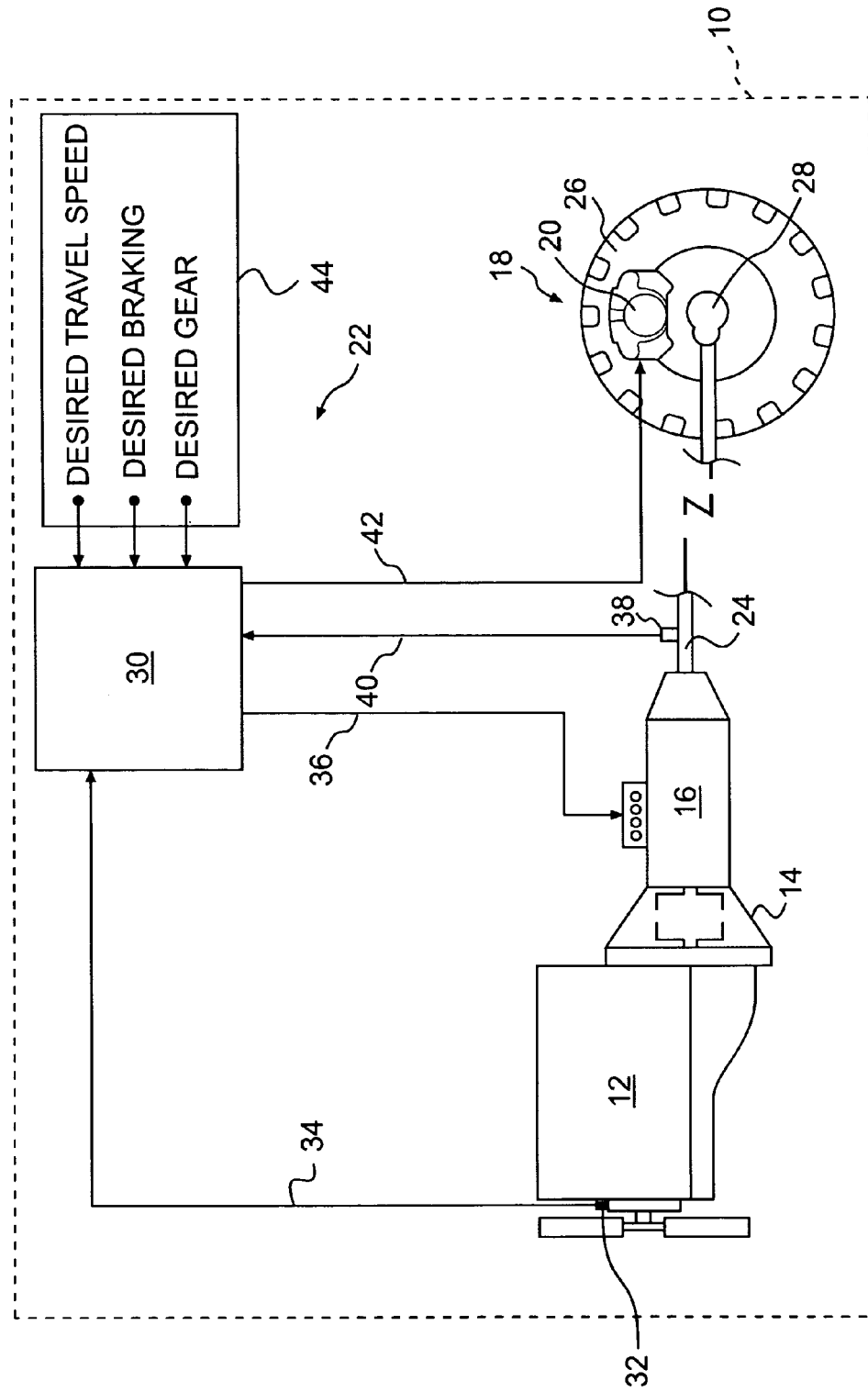
FIG. 1 is a diagrammatic illustration of a work machine having an exemplary disclosed transmission control system.

FIG. 1 illustrates an exemplary work machine 10. Work machine 10 may be a fixed or mobile machine that performs some type of operation associated with an industry such as mining, construction, farming, transportation, or any other industry known in the art. For example, work machine 10 may be an earth moving machine such as an off-highway truck, a wheel loader, a motor grader, or any other earth moving machine. Work machine 10 may alternately be a marine vessel, a passenger vehicle, or any other suitable operation-performing work machine. Work machine 10 may include a power source 12, a torque converter 14, a transmission 16 operably connected to a traction device 18, a brake mechanism 20, and a transmission control system 22.

Power source 12 may be configured to produce a power output at a range of rotational speeds and may include an internal combustion engine such as, for example, a diesel engine, a gasoline engine, a natural gas engine, or any other engine apparent to one skilled in the art. Power source 12 may, alternately, include another source of power such as a furnace, a battery, a fuel cell, or any other source of power known in the art.

Power source 12 may be controlled with a throttle mechanism (not shown) that is configured to indicate a desired work machine travel speed. The throttle mechanism may be any device capable of providing an electric signal signifying a desired work machine travel speed. For example, the throttle mechanism may be a movable pedal having a minimum throttle position and being movable through a range of positions to a maximum throttle position. A sensor (not shown), such as a switch or potentiometer, may be configured to sense the position of the throttle mechanism and to produce a desired work machine travel speed signal responsive to the throttle mechanism's position. The desired work machine travel speed signal may be provided to power source 12 to control throttling, and to transmission control system 22. A work machine travel speed signal signifying an increase in desired travel speed or a desire to maintain a current speed may indicate to transmission control system 22 that an assisted downshift or directional change shift may be undesirable at that time. It is contemplated that a desired work machine travel speed may be determined in another manner such as, for example, by monitoring a fuel setting, a boost pressure, an exhaust temperature, a valve timing, an output torque, or any other suitable parameter of power source 12.

Torque converter 14 may be a hydraulic device configured to couple transmission 16 to power source 12. Torque converter 14 may allow power source 12 to rotate somewhat independently of transmission 16. It is contemplated that torque converter 14 may alternately be embodied in a non-hydraulic device such as, for example, a mechanical diaphragm clutch.

Transmission 16 may include numerous components that interact to transmit power from power source 12 to traction device 18. In particular, transmission 16 may be a multi-speed bidirectional mechanical transmission having a neutral gear ratio, a plurality of forward gear ratios, a reverse gear ratio, and one or more clutches. The clutches may be selectively actuated to engage predetermined combinations of gears that produce a desired output gear ratio. It is contemplated that transmission 16 may be an automatic-type transmission, with shifting based on a power source speed, a maximum selected gear ratio, and a shift map, or a manual-type transmission, with shifting between each gear directly initiated by an operator. The output of transmission 16 may be connected to and configured to rotatably drive traction device 18 via a shaft 24, thereby propelling work machine 10. It is also contemplated that transmission 16 may alternately embody a continuously variable transmission such as, for example, an electric transmission having a generator and an electric motor, a hydraulic transmission having a pump and a fluid motor, or any other continuously variable transmission known in the art.

A gear selector (not shown) may be provided for indicating a desired transmission gear ratio and direction of travel. The gear selector may be any device capable of providing an electric signal indicating a desired gear ratio and direction of travel. For example, the gear selector may be a movable lever having a neutral position, a plurality of forward gear positions, and a reverse gear position. The desired gear ratio signal may be provided to transmission control system 22. In an automatic-type transmission, as work machine travel speed increases, transmission control system 22 may effect gear shifting in accordance with a shift map until a maximum desired gear is reached. In a manual-type transmission, transmission control system 22 may effect the exact gear change selected by the operator as the operator makes the selection. It is contemplated that the gear selector may alternately embody a mechanical device directly effecting gear shifting.

Traction device 18 may include wheels 26 located on each side of work machine 10 (only one side shown). Alternately, traction device 18 may include tracks, belts or other driven traction devices. Traction device 18 may be driven by transmission 16 to rotate in accordance with an output rotation of transmission 16.

Brake mechanism 20 may be configured to retard the motion of work machine 10 and may be operably connected to each wheel 26 of work machine 10. In one embodiment, brake mechanism 20 is a hydraulic pressure-actuated disk brake disposed intermediate wheel 26 and a drive assembly 28. Brake mechanism 20 may be manually operated using a brake pedal (not shown), which in turn directs pressurized fluid to brake mechanism 20. A degree of brake pedal actuation may proportionally control a pressure of the fluid supplied to brake mechanism 20. It is contemplated that brake mechanism 20 may alternately be actuated by pressurized air, mechanically actuated, electrically actuated, or actuated in any other manner known in the art.

A brake sensor (not shown) may be provided for indicating whenever actuation of brake mechanism 20 is desired. The brake sensor may be embodied in any device such as, for example, a switch or a sensor capable of producing an electric signal indicating that a braking operation is being performed. For example, a switch may indicate a position of a brake pedal (not shown), while a sensor may indicate a pressure of a hydraulic fluid or air supplied to brake mechanism 20, a current supplied to brake mechanism 20, or any other parameter known in the art.

Transmission control system 22 may include a controller 30 configured to control an operation of transmission 16 and brake mechanism 20. Controller 30 may be embodied in a single microprocessor or multiple microprocessors that include a means for controlling an operation of transmission 16 and brake mechanism 20. Numerous commercially available microprocessors can be configured to perform the functions of controller 30. It should be appreciated that controller 30 could readily be embodied in a general work machine microprocessor capable of controlling numerous work machine functions. Various other known circuits may be associated with controller 30, including power supply circuitry, signal-conditioning circuitry, solenoid driver circuitry, communication circuitry, and other appropriate circuitry.

Controller 30 may be in communication with various components of work machine 10. In particular, controller 30 may be in communication with a power source speed sensor 32 via a communication line 34 to receive an indication of a rotational speed of power source 12, with transmission 16 via a communication line 36 to affect gear shifting of transmission 16, with a work machine travel speed sensor 38 via a communication line 40 to receive an indication of a travel speed of work machine 10, and with brake mechanism 20 via a communication line 42 to effect actuation of brake mechanism 20. Power source speed sensor 32 may be embodied in a magnetic pick up sensor configured to sense a power source speed and to produce a signal corresponding to the rotational speed of power source 12. Similar to power source speed sensor 32, work machine travel speed sensor 38 may also be embodied in a magnetic pick up sensor, but configured to sense a work machine travel speed and to produce a travel speed signal. Work machine travel speed sensor 38 may be disposed on shaft 24, on a component of drive assembly 28, or on any other suitable component, and configured to produce a signal corresponding to the travel speed of work machine 10.

Controller 30 may also be in communication with an operator interface 44 to receive inputs indicative of a desired work machine travel speed, a desired braking condition, and a desired transmission gear ratio. For example, controller 30 may be in communication with the throttle mechanism sensor to detect when an accelerator pedal is depressed, may be in communication with the brake sensor to detect when the brake pedal is depressed, and/or may be in communication with the gear selector to detect when the gear selector has been operated.

Controller 30 may be configured to initiate either a downshift or a rotational direction shift of transmission 16 and to actuate brake mechanism 20. In particular, controller 30 may be configured to either reduce a travel speed of work machine 10 to within a predetermined range of a power source rotational speed value before initiating a downshift, or to reduce a travel speed of work machine 10 to within a predetermined range of a desired travel speed value before initiating a rotational direction shift. Controller 30 may reduce the travel speed of work machine 10 by automatically directing pressurized fluid or air to brake mechanism 20, by directing a current to brake mechanism 20, or otherwise actuating brake mechanism 20 when a desired shift has been determined. Once travel speed of work machine 10 is within the appropriate speed range, controller 30 may actuate the clutches of transmission 16 to selectively engage a predetermined combination of gears, thereby effecting the desired shift.

Figure 2:
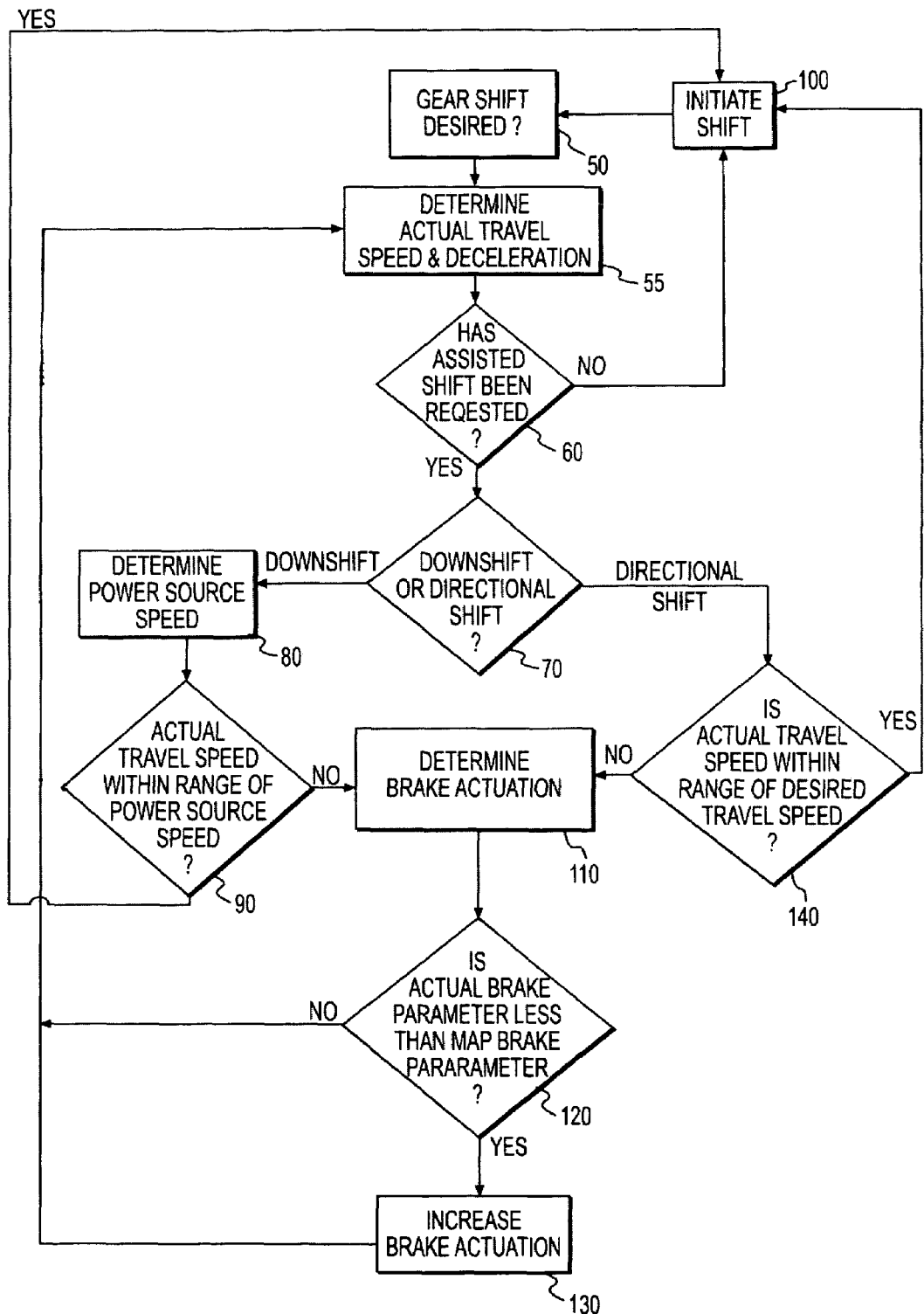
FIG. 2 is a flow chart illustrating an exemplary operation of the transmission control system of FIG. 1.

FIG. 2 illustrates an exemplary operation of transmission control system 22. FIG. 2 will be described in detail below.

INDUSTRIAL APPLICABILITY

The disclosed transmission control system may be applicable to any work machine where a reduction in the amount of vibration and/or wear associated with a downshift or a transmission rotational direction shift change of a work machine without the reduction of an associated power source speed is desired. As described above, gear shifts in a typical work machine may be initiated regardless of the magnitude of a rotational speed or direction differential between a power source and a transmission or regardless of a travel speed of the work machine. When a large differential exists, the work machine and/or the power source must rapidly gain or loose momentum. The rapid change in momentum may be exhibited in vibration within the work machine. The disclosed transmission control system may reduce this vibration by automatically actuating work machine braking before effecting a downshift or a directional shift, to thereby decrease the rate of momentum change while simultaneously maintaining high power source speeds.

Referring to FIG. 2, when transmission control system 22 is in operation, controller 30 may monitor a desired gear shift (step 50). Controller 30 may monitor a manually entered desired gear shift via a signal produced by the gear selector. Alternately, controller 30 may automatically determine the desired gear shift based on an output speed of power source 12 and a shift map. For example, as the output speed of power source 12 decreases to within a predetermined range of a downshift point on the shift map at a steady or increasing rate, controller 30 may determine that a desired shift is imminent.

If controller 30 monitors a desired gear shift selection or determines that a desired gear shift is imminent, controller 30 may then determine an actual travel speed of work machine 10 and a rate of deceleration (step 55). The actual travel speed may be determined via work machine travel speed sensor 38. Other methods of determining travel speed are contemplated and may include, for example, monitoring a power source speed via power source speed sensor 32, determining a current transmission gear ratio, and calculating a resulting work machine travel speed. The rate of deceleration may be determined by monitoring the actual travel speed of work machine 10 over a period of time.

The travel speed and deceleration information determined from step 55 may then be used to determine whether or not an assisted shift (controlled brake actuation) has been requested (step 60). If an increase in the desired travel speed is indicated (i.e., the throttle mechanism has been depressed) or if a constant desired travel speed is indicated (i.e., the throttle mechanism remains depressed), controller 30 may determine that an assisted gear shift has not been requested and may initiate the desired shift (step 100) without automatic actuation of brake mechanism 20. However, if the desired travel speed decreases (i.e., the throttle mechanism has been released), controller 30 may determine that an assisted gear shift has been requested. It is contemplated that controller 30 may further be configured to relinquish control of brake mechanism 20 if the rate of deceleration indicates that work machine 10 will enter a predetermined acceptable speed range within a predetermined acceptable period of time. The rate of deceleration may be determine by monitoring the actual travel speed of work machine 10 over a period of time. The rate of deceleration may then be compared with the current travel speed or power source speed of work machine 10 to determine a period of time before the actual travel speed of work machine 10 is within the predetermined acceptable speed range. When the actual travel speed of work machine 10 will enter the predetermined acceptable speed range within the predetermined acceptable period of time under the current rate of deceleration, controller 30 may make the determination that an assisted shift is not desired and will allow work machine 10 to continue decelerating at the current rate without actuating brake mechanism 20.

There may be instances when assisted shifting may be undesirable. For example, a work machine burdened with a heavy load and/or traveling up an incline may begin to loose travel speed because of insufficient torque provided to wheels 26. In response to the increased demand for torque, power source 12 may lug down in output speed and eventually reach a low shift point causing transmission 16 to downshift. In this situation, automatic braking may cause further loss of work machine travel speed and could potentially create a domino affect of downshifting. Further, when a work machine is decelerating smoothly toward a predetermined shift speed, automatic actuation brake mechanism 20 may cause additional vibration during the shift process than would normally occur.

Once the desire for an assisted shift has been established, controller 30 may then determine if the desired gear change is a directional change (reverse to forward or forward to reverse) or a downshift (step 70). A desired directional shift may be entered when the operator selects a reverse gear while work machine 10 is moving in a forward direction or when an operator selects a forward gear while work machine 10 is moving in a rearward direction. A desired downshift may be entered when the operator selects a lower gear ratio from a higher gear ratio or when a work machine speed drops below a predetermined low shift point. Controller 30 may use different base line speed ranges for comparison depending on whether the shift is a downshift or a directional shift.

If the desired shift is a downshift, controller 30 may then determine a power source speed (step 80) for comparison with the actual travel speed of work machine 10. Power source speed sensor 32 may provide a signal to controller 30 indicative of an output rotational speed value of power source 12. The actual travel speed of work machine 10 may then be compared with a predetermined range of speeds centered around the value of the power source speed (step 90). It is contemplated that the predetermined speed range may alternately be offset from the value of the power source speed to a lower or higher range. The size of the predetermined speed range may be based on individual work machine applications, a particular power source, a particular torque converter, a particular transmission, or other factors known in the art. It is contemplated that the speed range may increase in size and/or shift relative to the power source speed value depending on the desired gear change, and may be determined from one or more equations stored within a memory of controller 30 and/or referenced from a map stored in the memory of controller 30.

If the actual travel speed of work machine 10 is within the predetermined speed range, controller 30 may initiate the desired shift (step 100) by actuating the clutches within transmission 16 to engage the appropriate combination of gears. However, if the actual travel speed of work machine 10 is not within the predetermined speed range, controller 30 may determine a current brake actuation parameter (step 110) and compare this parameter to a map stored in the memory of controller 30 (step 120). This brake actuation parameter may include a pressure of the hydraulic fluid or air supplied to brake mechanism 20, an actuation position of the brake pedal that controls brake mechanism 20, a current supplied to brake mechanism 20, or any other suitable parameter known in the art. If the current brake actuation parameter is less than the map brake actuation parameter, the degree of actuation of brake mechanism 20 may be increased (step 130). After increasing the degree of actuation of brake mechanism 20, controller 30 may then return to step 55 where the actual travel speed and deceleration of work machine 10 may again be determined. If the brake actuation parameter is greater than the map brake actuation parameter, as determined in step 120, no additional braking may be implemented and controller 30 may return to step 55 where the actual travel speed and deceleration may again be determined.

Returning to step 70, if it is determined that the desired shift is a directional shift, the actual travel speed of work machine 10 may be compared to a predetermined speed range about a desired travel speed value (step 140). In one embodiment, the desired travel speed value may be nearly zero. However, it is contemplated that other appropriate speed values based on the work machine application, power source, torque converter, and/or transmission configuration may be implemented. The value of the desired travel speed may also be dependent on whether the desired directional shift is from forward to reverse, or from reverse to forward directions. The larger the value of the desired travel speed, the longer the shift duration may become and/or the greater the vibration experienced by work machine 10 and the work machine operator. A vibration that urges a work machine operator back into a seat within work machine 10 may be less noticeable and/or less of a nuisance than a vibration that urges the work machine operator out of the seat and/or against a safety restraint harness. Similar to the speed range described in association with step 90, the speed range about the desired travel speed value may be centered about the desired travel speed value, or offset to a lower or higher range. The size of the predetermined speed range of step 140 may be determined based on individual work machine applications, a particular power source, a particular torque converter, a particular transmission, or other factors known in the art.

If the actual travel speed value of work machine 10 is within the predetermined speed range of the desired travel speed value, controller 30 may initiate the desired directional shift (step 100) by engaging the appropriate combination of clutches within transmission 16. However, if the actual travel speed value of work machine 10 is not within the predetermined speed range of the desired travel speed value, controller 30 may determine a current brake actuation parameter (step 110) and compare this parameter to a map stored in the memory of controller 30 (step 120). If the current brake actuation parameter is less than the map brake actuation parameter, the degree of actuation of brake mechanism 20 may be increased (step 130). After increasing the degree of actuation of brake mechanism 20, controller 30 may return to step 55 where the actual travel speed and deceleration of work machine 10 is again determined. If the brake actuation parameter is greater than the map brake actuation parameter, no additional braking may be implemented and controller 30 may return to step 55 where the actual travel speed and deceleration is again determined.

It will be apparent to those skilled in the art that various modifications and variations can be made to the transmission control system of the present disclosure. Other embodiments of the transmission control system will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A transmission control system for a machine having a transmission and a traction device with a brake mechanism, the transmission control system comprising:
   a speed sensor configured to generate a signal indicative of a travel speed of the machine; and
   a controller in communication with the speed sensor and the brake mechanism, the controller configured to determine a current rate of deceleration of the machine, to determine a period of time before the travel speed of the machine drops below a predetermined travel speed, and to relinquish control of the brake mechanism when the determined period of time is less than a predetermined period of time, the controller further configured to determine when a transmission gear change is desired and to adjust operation of the brake mechanism in response to the signal from the speed sensor when the transmission gear change is desired.

2. The transmission control system of claim 1, wherein the controller is configured to actuate the brake mechanism when the machine travel speed is outside of a predetermined range of a desired travel speed value when the desired transmission gear change is indicated.

3. The transmission control system of claim 2, wherein the controller is in communication with the transmission and is further configured to initiate the desired transmission gear change when the machine travel speed is within the predetermined range of the desired travel speed value.

4. The transmission control system of claim 1, wherein the machine includes a power source, and the controller is configured to determine a power source output speed and to adjust operation of the brake mechanism when the travel speed of the machine is outside of a predetermined range of the power source output speed value when the desired transmission gear change is indicated.

5. The transmission control system of claim 4, wherein the controller is in communication with the transmission and is further configured to initiate the desired transmission gear change when the machine travel speed value is within the predetermined range of the power source output speed value.

6. The transmission control system of claim 1, wherein the controller determines the transmission gear change is desired in response to a power source output speed and a shift map stored in a memory of the controller.

7. The transmission control system of claim 1, wherein the desired transmission gear change is manually indicated by a machine operator.

8. The transmission control system of claim 1, wherein the desired transmission gear change is a downshift.

9. The transmission control system of claim 1, wherein the desired transmission gear change is a travel directional change of the machine.

10. The transmission control system of claim 1, wherein the controller is further configured to compare a current brake actuation parameter to a desired brake actuation parameter and to adjust the operation of the brake mechanism when the current brake actuation parameter is outside of a predetermined range of the desired brake actuation parameter.

11. The transmission control system of claim 10, wherein the brake actuation parameter is a pressure of a hydraulic fluid supplied to the brake mechanism.

12. The transmission control system of claim 10, wherein the brake actuation parameter is a pressure of air supplied to the brake mechanism.

13. The transmission control system of claim 10, wherein the brake actuation parameter is a current supplied to the brake mechanism.

14. The transmission control system of claim 1, wherein the transmission control system is configured to relinquish control of the brake mechanism when at least one of an increase in machine travel speed and a constant machine travel speed is desired.

15. The transmission control system of claim 14, wherein the machine includes a power source and the at least one of a desired increase in machine travel speed and a constant machine travel speed is determined 16. The transmission control system of claim 15, wherein the power source engine control parameter includes at least one of a fuel setting, a boost pressure, an exhaust temperature, and a valve timing.

17. A method of operating a machine having a power source, a transmission, and a traction device with a brake mechanism, the method comprising:
determining when a gear change of the transmission is desired;
determining a current rate of deceleration of the machine;
determining a period of time before the travel speed of the machine drops below a predetermined travel speed;
relinquishing control of the brake mechanism when the determined period of time is less than a predetermined period of time;
sensing a current travel speed of the machine; and
adjusting operation of the brake mechanism in response to the current travel speed when the gear change of the transmission is desired.

18. The method of claim 17, further including
comparing the current travel speed with a desired travel speed; and
adjusting operation of the brake mechanism when the current travel speed is outside of a predetermined range of the desired travel speed and the gear change of the transmission is desired.

19. The method of claim 18, further including initiating the desired gear change of the transmission when the current travel speed is within the predetermined range of the desired travel speed.

20. The method of claim 17, further including:
determining an output speed of the power source;
comparing the output speed of the power source with the current travel speed; and
adjusting operation of the brake mechanism when the current travel speed is outside of a predetermined range of the power source output speed and the gear change of the transmission is desired.

21. The method of claim 20, further including initiating the desired gear change of the transmission when the current travel speed is within the predetermined range of the power source output speed.

22. The method of claim 17, further including:
sensing a current brake actuation parameter;
comparing the current brake actuation parameter with a desired brake actuation parameter; and
adjusting operation of the brake mechanism when the current brake actuation parameter is outside of a predetermined range of the desired brake actuation parameter and the gear change of the transmission is desired.

23. The method of claim 22, wherein the brake actuation parameter is a pressure of a hydraulic fluid supplied to the brake mechanism.

24. The method of claim 22, wherein the brake actuation parameter is a pressure of air supplied to the brake mechanism.

25. The method of claim 22, wherein the brake actuation parameter is a current supplied to the brake mechanism.

26. The method of claim 17 further including:
determining a desired machine travel speed; and
relinquishing control of the brake mechanism when at least one of an increase in desired machine travel speed and a desired constant machine travel speed is determined.

27. A machine, comprising:
a power source configured to produce a power output;
a traction device;
a brake mechanism operably connected to the traction device and configured to reduce a travel speed of the machine;
a transmission connected to the power source and configured to drive the traction device; and
a transmission control system, including:
a speed sensor configured to generate a signal indicative of the travel speed of the machine; and
a controller in communication with the speed sensor and the brake mechanism, the controller configured to determine a current rate of deceleration of the machine, to determine a period of time before the travel speed of the machine drops below a predetermined travel speed, and to relinquish control of the brake mechanism when the determined period of time is less than a predetermined period of time, the controller further configured to determine when a transmission gear change is desired, and to adjust operation of the brake mechanism in response to the signal from the speed sensor when the transmission gear change is desired.

28. The machine of claim 27, wherein the controller is configured to actuate the brake mechanism when the machine travel speed is outside of a predetermined range of a desired travel speed and the transmission gear change is desired, and to initiate the desired transmission gear change when the machine travel speed is within the predetermined range of the desired travel speed.

29. The machine of claim 27, wherein the controller is further configured to determine a power source output speed and to actuate the brake mechanism when the machine travel speed is outside of a predetermined range of the power source output speed when the transmission gear change is desired, and to initiate the desired transmission gear change when the machine travel speed is within the predetermined range of the power source output speed.

30. The machine of claim 27, wherein the desired transmission gear change is determined in response to a power source output speed and a shift map stored in a memory of the controller.

31. The machine of claim 27, wherein the desired transmission gear change is manually entered by a machine operator.

32. The machine of claim 27, wherein the desired transmission gear change is a downshift.

33. The machine of claim 27, wherein the desired transmission gear change is a travel directional change of the machine.

34. The machine of claim 27, wherein the controller is further configured to compare a current brake actuation parameter to a desired brake actuation parameter and to adjust operation of the brake mechanism when the current brake actuation parameter is outside of a predetermined range of the desired brake actuation parameter.

35. The machine of claim 34, wherein the brake actuation parameter is a pressure of a hydraulic fluid supplied to the brake mechanism.

36. The machine of claim 34, wherein the brake actuation parameter is a pressure of air supplied to the brake mechanism.

37. The machine of claim 34, wherein the brake actuation parameter is a current supplied to the brake mechanism.

38. The machine of claim 27, wherein the transmission control system is configured to relinquish control of the brake mechanism when at least one of an increase in machine travel speed and a constant machine travel speed is desired.

39. The machine of claim 38, wherein the at least one of a desired increase in machine travel speed and a desired constant machine travel speed is determined from a power source engine control parameter.

40. The machine of claim 39, wherein the power source engine control parameter includes at least one of a fuel setting, a boost pressure, and exhaust temperature, and a valve timing.

* * * * *